United States Patent [19]

Yamamoto

[11] Patent Number: 4,546,467
[45] Date of Patent: Oct. 8, 1985

[54] MONITOR FOR TRANSMISSION LINE

[75] Inventor: Sumio Yamamoto, Tokyo, Japan

[73] Assignee: Nippon Electric Co., Ltd., Tokyo, Japan

[21] Appl. No.: 463,421

[22] Filed: Feb. 3, 1983

[30] Foreign Application Priority Data

Feb. 3, 1982 [JP] Japan .................................. 57-16749

[51] Int. Cl.$^4$ ............................ H04J 1/16; H04J 3/14
[52] U.S. Cl. ........................................ 370/13; 371/25
[58] Field of Search ...................... 370/13, 86, 85, 94, 370/60; 371/25, 29; 310/825.3; 179/175.26

[56] References Cited

U.S. PATENT DOCUMENTS

| | | | |
|---|---|---|---|
| 3,219,927 | 11/1965 | Topp, Jr. et al. | 340/825.3 |
| 4,138,599 | 2/1979 | Munter | 370/13 |
| 4,208,552 | 6/1980 | Castriotta et al. | 370/13 |
| 4,245,250 | 8/1982 | Jacobsthal | 370/85 |
| 4,320,508 | 3/1982 | Takezoe | 371/25 |
| 4,439,763 | 3/1984 | Limb | 370/85 |
| 4,476,561 | 10/1984 | Baackman et al. | 371/25 |

OTHER PUBLICATIONS

1st International Conference on Distributed Computing Systems, "Architecture Considerations for Local Computer Networks"; Thurber et al.; Oct. 1979; pp. 131-142.
Electronics, "Local Network Gives New Flexibility to Distributed Processing"; Bass et al.; Sep. 25, 1980; pp. 114-212.

Primary Examiner—Douglas W. Olms
Assistant Examiner—Frank M. Scutch, III
Attorney, Agent, or Firm—Sughrue, Mion, Zinn, Macpeak and Seas

[57] ABSTRACT

A monitoring device for monitoring the status of communication units connected to a common transmission medium. The monitoring device sequentially addresses each communication unit and transmits to the addressed unit an inquiry frame which includes in addition to the destination address, a source address field and a control information field. The addressed communication unit, if operating responds with a reply frame including the destination address of the monitor, its address, and a status information field. The received status information is compared with a previously received status information from the addressed control unit, and a primary fault is indicated when the compared informations do not coincide. A secondary fault is indicated if no reply frame is received from an addressed communication unit within a predetermined time from the transmission of the inquiry frame.

5 Claims, 9 Drawing Figures

MONITOR FOR TRANSMISSION LINE

The present invention relates to a data transmission system and, more particularly, to a transmission line monitoring device for a local computer network.

The local computer (LC) network may be defined as a data communication system which employs a common transmission medium for the communication between a plurality of communication units which are operable independently of each other, a computer being connected to at least one of the communication units. Details of such a system are described in K. J. Thurber et al. "ARCHITECTURE CONSIDERATIONS FOR LOCAL COMPUTER NETWORKS", PROCESSINGS of the 1st International Conference on DISTRIBUTED COMPUTING SYSTEMS, pp. 131-142, Oct. 1979.

Meanwhile, an LC network system equipped with a network monitor to locate hardware troubles or faults in either transmission lines or communication units is proposed in Charlie Bass et al. "Local Network Gives New Flexibility to Distributed Processing", Electronics, pp. 114-212, Sept. 25, 1980.

However, the design of this system is not to detect a status change in a monitored unit but to display a fault itself in response to the fault detection. Therefore, if many faults are detected at one time, the network monitor keeps displaying those faults. Some of those faults tend to be overlooked as a result.

SUMMARY OF THE INVENTION

It is one object of the present invention to provide a transmission line monitoring device for an LC network which overcomes the drawback stated above.

In a network system wherein at least one data communication unit and a transmission line monitoring device are interconnected by a common transmission line, the monitoring device of the present invention comprises:

means for exchanging data with a specific data communication unit via the common transmission line:

means for receiving status information fed from the data communication unit;

storage means for storing the status information fed from the data communication unit;

comparator means for comparing the status information of the data communication unit stored in the storage means with new status information returned from the data communication unit;

display means for displaying the new status information in response to the result of comparison at the comparator means; and status information writing means for writing the new status information in the storage means.

BRIEF DESCRIPTION OF THE DRAWINGS

The present invention will be described in detail with reference to the accompanying drawings in which.

DETAILED DESCRIPTION OF THE PREFERRED EMBODIMENTS

Figure 1:
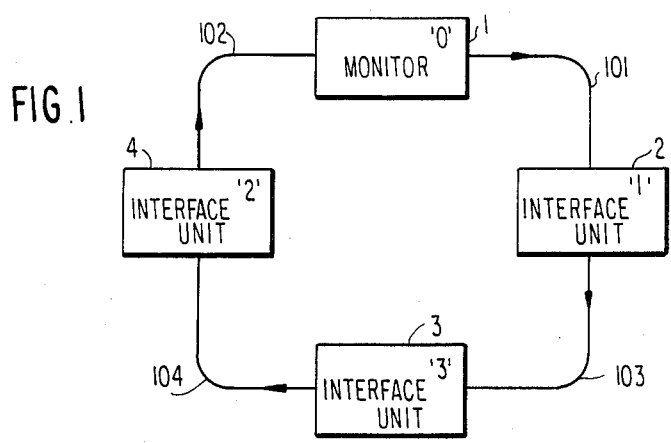
FIG. 1 is a diagram of a local computer network system to which the present invention is applicable.

In the drawings, the same reference numerals designate the same structural elements.

Referring to FIG. 1, a network system to which the present invention is applicable includes a transmission line monitor 1, loop interface units 2, 3 and 4 each being equipped with a computer or the like, and transmission lines 101, 102, 103 and 104 adapted to loop the monitor and interface units 1 to 4.

In this system, the monitor 1 sends an inquiry frame to specific one of the interface units 2 to 4.

Figure 2:
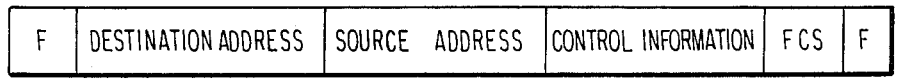
FIG. 2 is a diagram of an inquiry frame.

Referring to FIG. 2, the inquiry frame comprises a destination address field or section indicative of the address of the specific unit, a source address section indicative of the monitor which sends the frame, a control information section indicative of an instruction to the loop interface unit, an FCS section for error detection of the whole frame, and flag sections (F) which indicate the head and tail of the frame, respectively. The destination address and source address sections will be omitted for a system which includes only one loop interface unit.

The loop interface unit having received the inquiry frame examines the destination address to determine that this frame is meant for its own unit. In response to the inquiry frame, the unit transmits a reply frame including the status information section.

Figure 3:
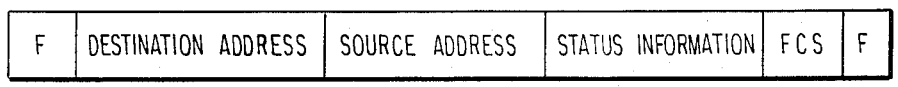
FIG. 3 is a diagram of a replay frame.

As shown in FIG. 3, the reply frame comprises a destination address section indicative of the address of the monitor 1, a source address section indicative of the loop interface unit, a status information section indicative of its own status, an FCS section for error detection of the whole frame, and flag sections (F) designating the head and tail of the frame, respectively. This reply frame is fed to the monitor 1 via the transmission lines. Such inquiry and reply sequentially occur from the loop interface unit 2 to the loop interface unit 4. As a certain interval expires after the series of operations described, another similar series of operations for inquiry and reply are performed. If the unit 2 is not in its ordinary state, it cannot send a reply frame back to the monitor 1. Thus, when a predetermined time has expired before the reception of the reply frame after the transmission of the inquiry frame, the monitor 1 detects that a time out fault has occurred in the unit 2 and generates time out fault information. This information and the previous status information of the unit 2 are compared to each other in the monitor 1 and, if different, "time out fault" is displayed in the monitor 1.

Reference may be made to U.S. Pat. No. 4,293,948 for details of the lines 101 to 104 and interface units 2 to 4 of the illustrated network system.

While the data communication from each of the units 2 to 4 to the monitor 1 may be effected in the same way as disclosed in U.S. Pat. No. 4,293,948, the method for transmitting data between units 2 to 4 to the monitor does not, in and of itself, form a portion of this invention. Therefore, it will not be described herein.

Figure 4:
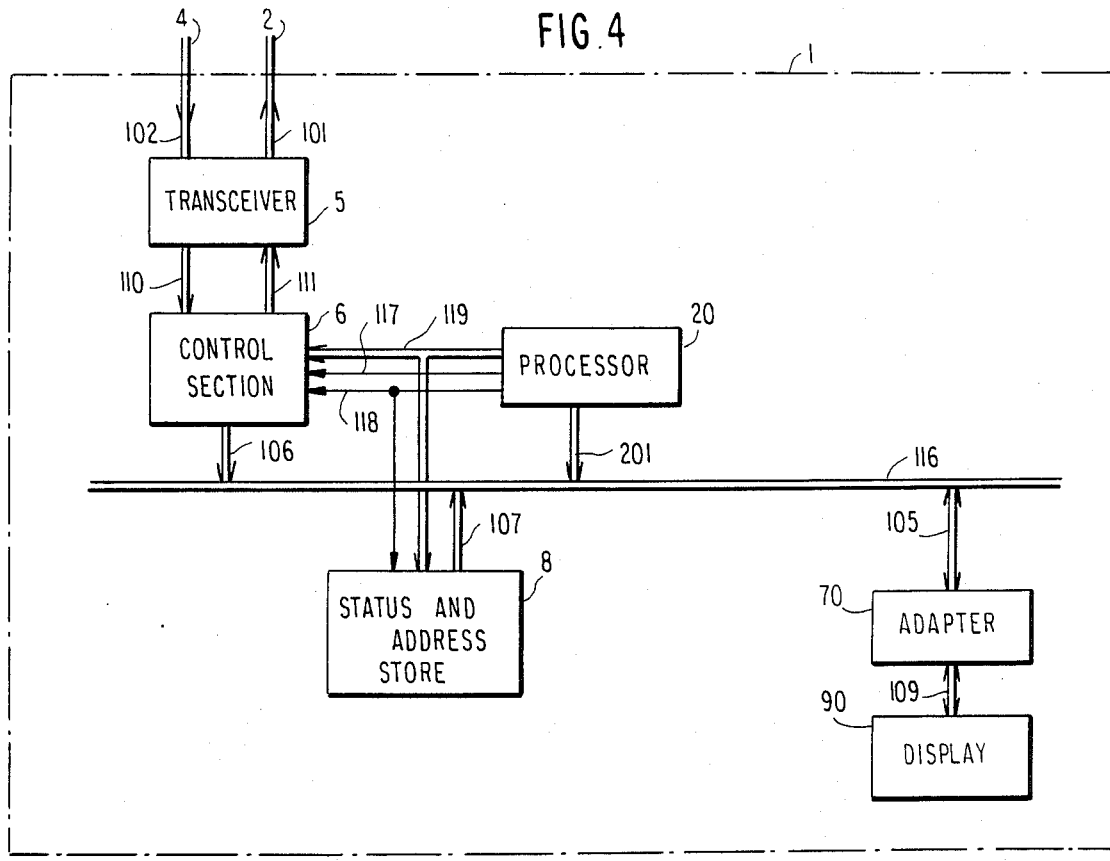
FIG. 4 is a block diagram showing one embodiment of the present invention.

Referring to FIG. 4, the monitor 1 comprises a transceiver section 5, a monitor control section 6, a status and address storage section 8, a processor section 20, an adaptor section 70, a display section 90 and a bus 116.

Figure 5:
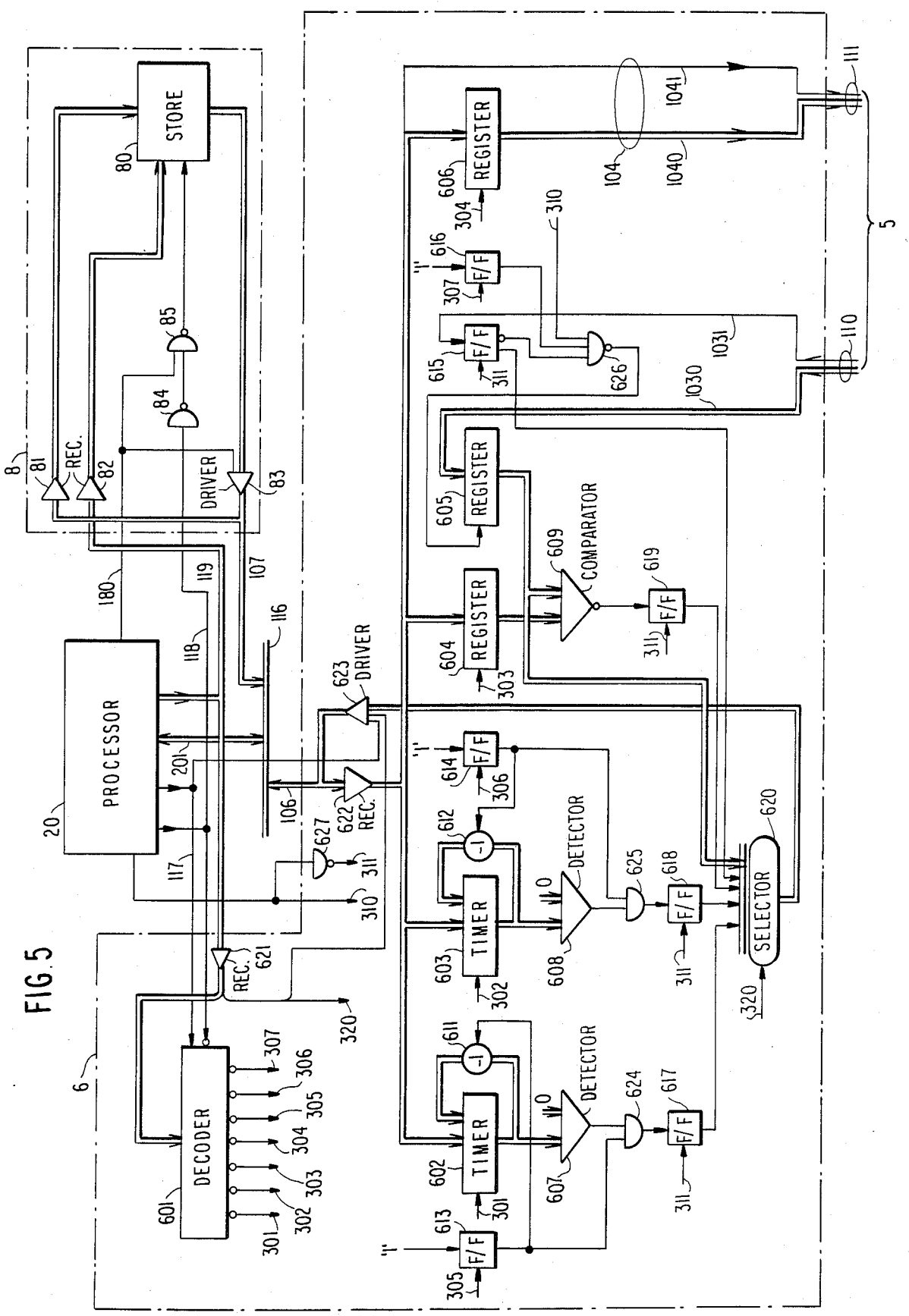
FIG. 5 is a block circuit diagram of the control section of transmission line monitor according to the teachings of the invention.

As shown in FIG. 5, the monitor control section 6 is made up of a decoder 601, a first timer 602, a second timer 603, registers 604, 605 and 606, "0" detector circuits 607 and 608, a comparator 609, substractors 611 and 612, flip-flops 613 to 619, a selector 620, receivers 621 and 622, a driver 623, AND gates 624 and 625, a NAND gate 626 and an inverter 627.

The storage 8 comprises a storage circuit 80, receivers 81 and 82, a driver 83, an inverter 84 and a NAND gate 85.

Figure 6:
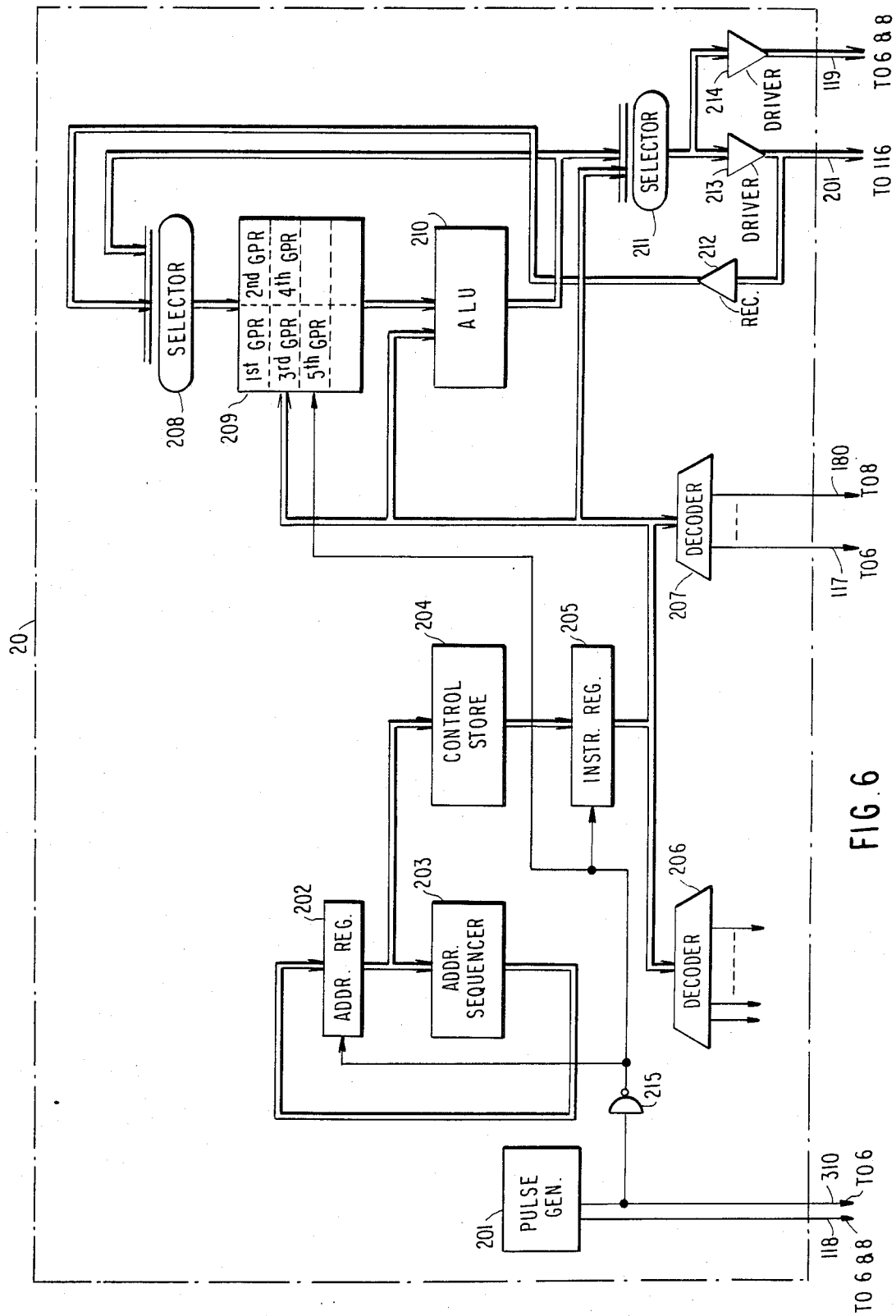
FIG. 6 is a block circuit diagram of the processor of the transmission line monitor according to the teachings of the invention.

Referring to FIG. 6, the processor 20 comprises a pulse generator 201, an address register 202, an address sequencer 203, a control store 204 for storing a plurality of microinstructions, a microinstruction register 205, decoders 206 and 207, a selector 208, a register group 209 comprising first to seventh general purpose registers (GPRs), an arithmetic and logical unit 210, a selector 211, a receiver 212, drivers 213 and 214, and an inverter 215.

Reference will be made to FIGS. 1 to 9 for describing the operation of the transmission line monitor of the present invention.

Figure 9:
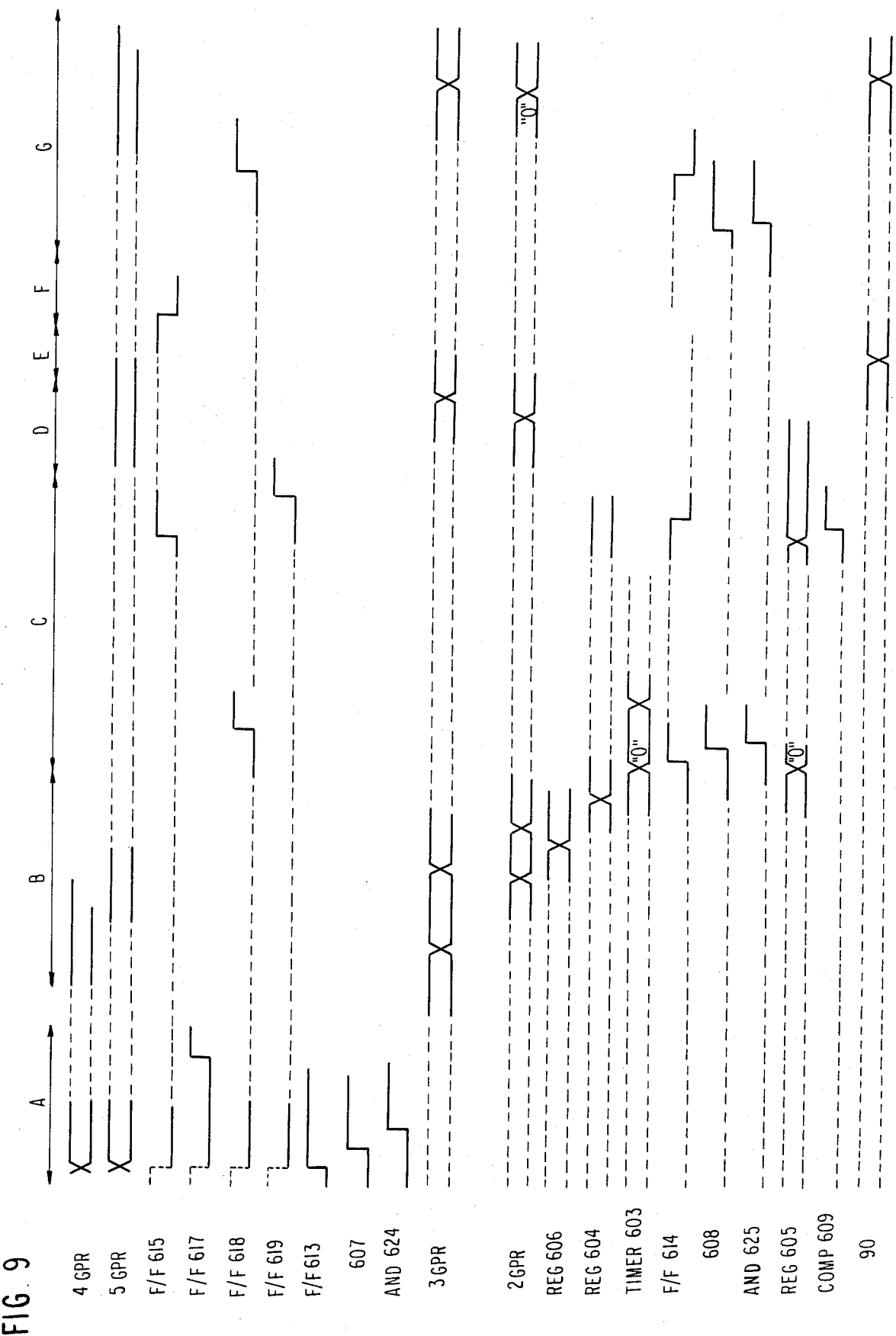
FIG. 9 is a timing chart demonstrating operations of the embodiment of the present invention.

Initialization (see A in FIG. 9)

First, the monitor 1 is initialized by setting initial values to the fourth and fifth GPRs of the processor 20 shown in FIG. 6 and by clearing the flip-flops 615, 617, 618 and 619 shown in FIG. 5. At the same time, the first timer 602 in FIG. 5 is loaded with an initial value. In response to the setting of the flip-flop 613, the timer 602 is triggered. The initial value set in the timer 602 designates the interval between the sequential inquiries from the monitor 1 of FIG. 1 to the units 2, 3 and 4, and the next sequential inquiries to the same units 2, 3 and 4. As the time set by the timer 602 expires, logical "1" output of the "0" detector 607 is fed to the flip-flop 617 via the AND gate 624 thereby setting the flip-flop 617.

Transmission of Inquiry Frame (see B in FIG. 9)

Upon setting of the flip-flop 617, the transmission of inquiry frames from the monitor 1 to the units 2 to 4 occur under the control of the processor 20. The initial value stored in the fourth GPR of the register group 209 in FIG. 6 is stored in the third GPR adapted to designate addresses of the storage 80 shown in FIG. 5. Then, the destination address necessary for the frame arrangement shown in FIG. 2 is read out of the location of the storage 80, which has been accessed based on the initial value stored on the third GPR.

The destination address information is loaded in the second GPR of the register group 209 and then fed from the processor 20 to the register 606 via the buses 201, 116 and 106 and receiver 622. Simultaneously, the fixed source address and control information shown in FIG. 2 are fed from the processor 20 to the register 606 via the buses 201 and 116 and receiver 622. The register 606 shown in FIG. 5 is of the first-in-first-out (FIFO) type having a capability large enough to store 16 words at the maximum.

In parallel with such storage operations, the initial value "MAXS" in the fifth GPR is supplied to the third GPR of the register group 209. With the "MAXS" in the third GPR employed as an address, the storage 80 (see FIGS. 5 and 8) is accessed to produce the status information (FIG. 8) of the unit 2 shown in FIG. 2. This status information is loaded in the register 604 via the second GPR. Thereafter, the content of the register 605 shown in FIG. 5 is reset and the flip-flop 616 is set while the inquiry frame in the register 606 is transmitted.

Reply Frame Check (see C in FIG. 9)

After the transmission of an inquiry frame, the second timer 603 is initialized and a reply frame responsive to the inquiry frame is checked.

In FIG. 5, when the flip-flop 614 is set and the second timer 603 reaches "0", the output signal of the "0" detector 608 is fed to the flip-flop 618 via the AND gate 625 thereby setting the flip-flop 618.

The processor 20 sets an initial value in the second timer 603 while setting the flip-flop 614 to drive the second timer 603. In response to setting of the flip-flop 614, the timer 603 is triggered.

Then, the content of the flip-flop 614 is checked. If the reply frame responsive to the inquiry frame has not been returned to the monitor 1 yet, the flip-flop 615 will not have been set. When the reset status of the flip-flop 615 has been detected, timer 603 is checked whether it has reached "0". If the value of the timer 603 is not "0", the content of the flip-flop 615 is checked once more. Thus, as long as the flip-flop 615 is reset and the value of the second timer 603 is not "0", the check procedure mentioned in repeated. The flip-flop 615 is set in response to the arrival of the reply frame shown in FIG. 3 which corresponds to the inquiry frame shown in FIG. 2. This arrival in turn resets the flip-flop 614. If the unit 2 shown in FIG. 1 is normally operable, the contents of the registers 604 and 605 will coincide with each other and therefore the flip-flop 619 will not be set. If the status of the unit 2 differs from the status obtained by the preceding inquiry, the contents of the registers 604 and 605 will not coincide with each other. Accordingly, the comparator 609 delivers a logical "1" signal to set the flip-flop 619.

Primary Fault Information Storage (see D in FIG. 9)

Thereafter, the content of the register 605 is loaded in the second GPR via the selector 620 and driver 623. Then, the content of the fifth GPR is stored in the third GPR. The content of the third GPR is employed as an address to access the storage 80 of FIG. 5. The content of the second GPR, i.e., new status information indicative of the fault in the unit 2 (primary fault data) is stored in the designated location of the storage 80.

Primary Fault Display (see E in FIG. 9)

Figure 7:
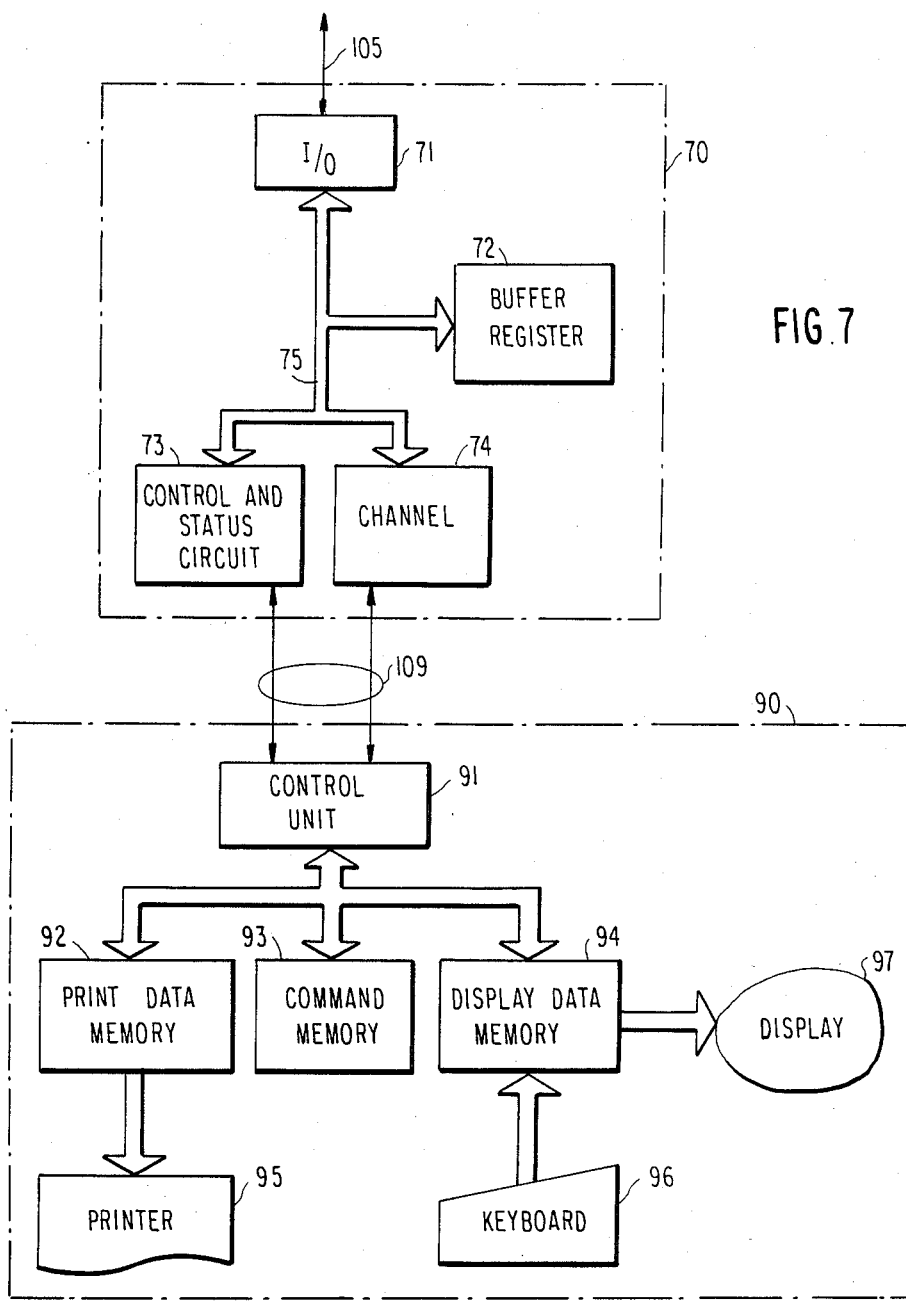
FIG. 7 is a block circuit diagram of the adapter and display sections of the transmission line monitor according to the teachings of the invention.

Referring to FIG. 7, the adapter section 70 comprises a bus input/output 71, a buffer register 72, a control and status circuit 73, a channel 74 and an internal bus 75.

In parallel with the storage operation of the primary fault information, status information indicative of the primary fault is fed from the processor 20 to the display section 90 of FIG. 5 via the buses 201, 116 and 105, unit 71, bus 75 and circuit 73 of the adapter 70 and bus 109.

The display section 90 comprises a communication control unit 91, a print data storing memory 92, a command storing memory 93, a display data storing memory 94, a printer 95, a keyboard 96 and a display 97.

The display section 90 receives at its unit 91 the status information which indicates the primary fault. The information thereafter appears on the display 97 via the memory 94.

Inquiry To Units 3 and 4 (see F in FIG. 9)

Figure 8:
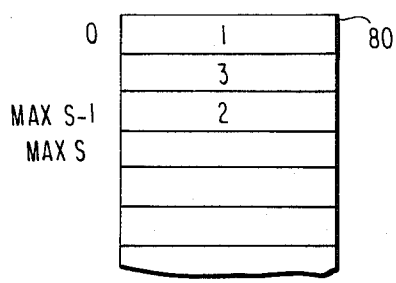
FIG. 8 is a block diagram of the store 80 of the status and address store of the transmission line monitor according to the teachings of the invention.

In the situation discussed above, the flip-flops 615 and 616 shown in FIG. 5 are reset to access the next location of the storage 80 shown in FIG. 8, whereby an inquiry frame is transmitted to the next unit 3 of FIG. 1. The monitor 1 receives a reply frame corresponding to the inquiry frame and, then, checks the content of the reply frame. The same operation as described above is performed on the other unit 4.

Detection and Display of Secondary Fault (see G in FIG. 9)

After the exchange of inquiry and reply frames between the monitor 1 and each of the units 2 to 4 and checking of the reply frames, the monitor 1 is initialized, inquiry frames are transmitted, and then reply frames corresponding to the inquiry frames are checked.

Now, the display section 90 is displaying the primary fault status of the unit 2. The detection and display operations of a secondary fault which may arise during the display of the primary fault will be described in detail hereinafter.

When a new fault (secondary fault) such as unit-down in the unit 2 occurs, the inquiry frame transmitted to the unit 2 is not responded by a reply frame. The flip-flop 615, therefore, remains in the reset state. Thereafter, the value of the second timer 603 is checked to determine whether it is "0", the reset state. When the reply frame is not supplied before the timer 603 runs out, the timer 603 returns to "0" state as the preset time is reached, thus indicating the absence of the reply frame. Then, the flip-flop 618 is set and this situation is notified to the processor 20. The flip-flop 618 in turn resets the flip-flop 614. Subsequently, the content of the fifth GPR is stored in the third GPR so that access is made to the storage 80 employing the content of the third GPR as an address. The content "0" of the second GPR is stored in the designated address of the storage 80. At the same time, the display section 90 provides visible indication of the secondary fault thereon.

In summary, it will be seen that the present invention allows an operator to readily see any change in status of each loop interface unit and take an adequate measure against troubles by comparing the latest status achieved by an inquiry with the status just before the inquiry and displaying the latest status only when it differs from the past status. The display is provided not only at the instant the trouble has occurred but at the instant it has been removed. Additionally, the monitor of the present invention responds to turn-on of a power source by displaying new turn-on of a power source associated with each loop interface unit.

What is claimed is:

1. In a network system wherein at least one data communication unit and a transmission line monitoring device are interconnected by a common transmission line, the monitoring device comprising:
   means for exchanging data with a specific data communication unit via the common transmission line;
   means for receiving status information fed from said data communication unit;
   storage means for storing the status information fed from said data communication unit and connected to the receiving means
   comparator means for comparing said status information of the data communication unit stored in the storage means with new status information returned from the data communication unit;
   display means for displaying the new status information in response to the result of comparison at the comparator means; and
   status information writing means for writing the new status information in the storage means in place of the previously stored status information after said new status information has been compared with the stored status information in said comparator means.

2. In a local communication network including at least one communication unit connected to a transmission medium, a monitoring device comprising:
   processor means for composing an inquiry frame, said inquiry frame containing at least a destination address field identifying a particular one of said at least one communication unit, a source address field and a control information field;
   means for transmitting the inquiry frame to said at least one communication unit;
   means for receiving a reply frame from the particular one of said at least one communication unit identified by the inquiry frame, said reply frame containing at least a destination address field, a source address field and a status information field containing information on the status of the particular communication unit identified by the inquiry frame;
   status information storage means for storing status information relative to the particular communication unit identified by the inquiry frame;
   means for comparing the received status information with status information stored in said status information storage means;
   means for displaying a fault condition when the received status information does not coincide with the stored status information; and
   means for replacing the stored status information with the received status information in said status information storage means when said received status information does not coincide with the stored status information.

3. The monitoring device of claim 2 further including; first register means for storing status information received in a reply frame, and second register means for storing status information from said status information storage means, the contents of said first and second register means being compared in said comparing means.

4. The monitoring device of claim 3, further including; reply frame reception timer means for defining an allowed time interval for transmission of one inquiry frame and one reply frame, means for detecting the absence of a reply frame within the time interval set by said reply frame reception timer means and for producing a fault detection signal in response to the transmission of an inquiry frame and the absence of a reply frame within said time interval.

5. The monitoring device of claim 2, wherein said communication network includes at least two communication units each designated by a unique destination address and connected to a common transmission medium, said monitoring device further including means for periodically and sequentially interrogating each of said communication units with an inquiry frame, said interrogating means comprising interrogation timer means for designating the time interval between a sequential interrogation of said communication units and the next sequential interrogation of said communication units, processor means, responsive to the timing out of said interrogation means, for producing said inquiry frames, means for transmitting said inquiry frames to said communication units, and means for receiving a reply frame from each interrogated communication unit.

* * * * *